Patented May 9, 1950

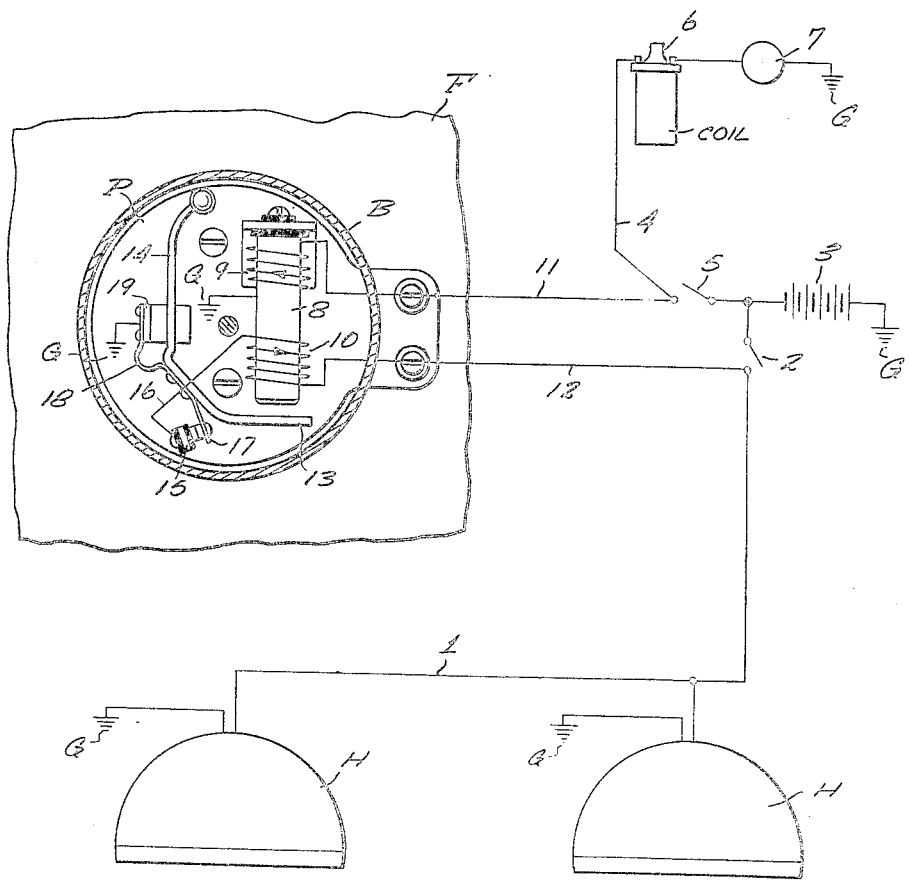

2,507,398

UNITED STATES PATENT OFFICE 2,507,398

AUTOMOBILE LIGHTS ALARM

Arturo Castro, Los Angeles, Calif.

Application April 22, 1948, Serial No. 22,657

1 Claim. (Cl. 177—311)

The present invention relates to the general class of electric lamp signals, including head lights and tail lights for automotive vehicles, and more specifically to improved automobile lights alarm of the aural or audible type, designed for use as a warning to the vehicle driver, before the driver leaves the vehicle, that the lights are still illumined, although the ignition may have been turned off, and thus notifying the driver that the light switch has not been turned off.

The electrically controlled signal or alarm in the nature of a bell, or similar annunciator, is connected with the ignition system and the lamp system or lighting system of the vehicle, and the signal is inoperative while the ignition circuit alone or the lighting circuit are initially and simultaneously closed for operation of the vehicle.

Means, electromagnetically controlled, are employed in connection with the lamp circuit for automatically closing the signal circuit and sounding the alarm, should the ignition be turned off, and through inadvertence the lamp circuit is left on.

The alarm system includes a minimum number of standard parts that may be assembled with facility and installed with convenience, to provide a simple and reliable alarm that is inexpensive in first cost and efficient in the performance of its functions; and the invention consists in certain novel features of construction and combinations and arrangements of parts as will hereinafter be described and more particularly set forth in the appended claim.

In the accompanying drawing, which is a diagrammatic arrangement of the wiring and appliances, the parts are combined and arranged in accord with a mode I have devised for the practical application of the invention to the headlight system of the automotive vehicle; but it will be understood that changes and alterations are contemplated and may be made in these exemplifying drawings and structures, within the scope of my claims, without departing from the principles of the invention.

In order that the general arrangement and utility of parts may readily be understood I have designated as F a portion of the vehicle frame, and wires or conductors are grounded as at G. A bell as B is mounted on a base plate designated as P, and the two headlight H, H, are shown in series in the lamp circuit 1, which is provided with a switch 2 and a battery 3 or other source of electrical energy.

The primary ignition circuit 4 of the automobile or other vehicle is equipped with a usual switch 5 appliances as coil 6 and a distributer 7, and grounded as at G, and in the diagram both of the manually controlled switches 2 and 5 are opened or turned off. When the automobile is running, as at night, both of the switches are of course closed, and the annunciator or warning signal is retained in inoperative position.

In connection with the two circuits 1 and 4 an electromagnet is employed for controlling the audible signal or bell B which magnet consists of a soft iron core 8 that is equipped with and common to two co-equal coils 9 and 10, the former being grounded on plate P and connected by wire or conductor 11 to the ignition switch 5; and the latter coil 10 is connected by wire 12 to the lamp switch 2. These coils are wound in opposite directions in order that when energized by the closed ignition circuit and the closed lamp circuit they oppose and neutralize each other and thus do not attract the armature 13 to its core; and when the circuits are open, as indicated, the armature is free of the core and of the influence of the magnet.

The armature is of the resiliently vibratory type and it is equipped with a striker or clapper 14 for intermittent co-action with the bell B as the armature vibrates or oscillates in close relation to the core and to the bell.

An intermittently opened and closed alarm switch for the armature includes a fixed contact 15 mounted on and insulated from the plate P and connected in series with the coil 10 by wire 16, and the movable contact member mounted upon a resilient or elastic blade 17 attached to the armature, and the blade is grounded at G on the plate P through a resilient conductor-support 18 and its supporting base 19 mounted on the plate P and frame F.

Assuming the ignition switch 5 to be closed and the lamp switch 2 to be open, the ignition circuit is energized, the coil 9 of the electromagnet retains the armature in a fixed position, and closing or opening of the lamp switch 2 will have no effect upon the armature 13.

When the vehicle is stopped, the ignition switch is opened cutting out the coil 9 and releasing the armature which assumes the position shown in the diagram, and if the switch 2 is inadvertently left closed the alarm is activated.

Under these conditions the wire 12 is included in the lamp circuit and consequently the coil 10 is energized, the armature is vibrated, and the striker co-acts with the bell to sound the warning signal that the lamp switch should also be opened.

Having thus fully described my invention, what I claim as new and desire to secure by Letters Patent is:

In an electrical signalling system for automotive vehicles having a lamp circuit provided with a switch therein, and an ignition circuit provided with a switch therein, and a source of energy for both circuits, the improvement comprising, an electromagnet having a core provided with two co-equal opposed coils, and one of said coils is grounded and connected with the ignition circuit, and the other of said coils is connected with the lamp circuit, an audible signal having a vibratory armature responsive to either of said coils, a fixed contact connected to said lamp circuit coil and a contact mounted on said armature associated with said fixed contact, said contacts being biased to a closed position by a spring arm on which said armature is mounted and said contacts opening only when one of the coils alone is energized, whereby when the switch in said ignition circuit in open and the switch in said lamp circuit is closed said audible signal will be actuated by said vibratory armature for the indication thereof.

ARTURO CASTRO.

REFERENCES CITED

The following references are of record in the file of this patent:

UNITED STATES PATENTS

| Number | Name | Date |
|---|---|---|
| 1,461,215 | Hunt | July 10, 1923 |
| 2,101,407 | Morland | Dec. 7, 1937 |
| 2,439,634 | Robey | Apr. 13, 1948 |